United States Patent [19]

Greene

[11] Patent Number: 4,850,261

[45] Date of Patent: * Jul. 25, 1989

[54] NON-CONTACTING ELECTRO-PNEUMATIC SERVO FOR VIBRATION ISOLATION

[75] Inventor: Geoffrey L. Greene, Germantown, Md.

[73] Assignee: Technical Manufacturing Corporation, Peabody, Mass.

[ * ] Notice: The portion of the term of this patent subsequent to Mar. 15, 2005 has been disclaimed.

[21] Appl. No.: 164,582

[22] Filed: Mar. 7, 1988

Related U.S. Application Data

[62] Division of Ser. No. 869,981, Jun. 3, 1986, Pat. No. 4,730,541.

[51] Int. Cl.$^4$ .................. F16M 13/00; F15B 13/16
[52] U.S. Cl. ......................... 91/362; 248/638
[58] Field of Search ................ 91/362; 248/638, 550, 248/566, 636; 188/DIG. 1

[56] References Cited

U.S. PATENT DOCUMENTS

| | | | |
|---|---|---|---|
| 3,952,979 | 4/1976 | Hansen | 248/550 |
| 4,328,941 | 5/1982 | Phillips et al. | 248/550 |
| 4,477,045 | 10/1984 | Karasawa et al. | 248/550 X |
| 4,730,541 | 3/1988 | Greene | 91/362 |

Primary Examiner—William E. Wayner
Attorney, Agent, or Firm—Samuels, Gauthier, Stevens & Kehoe

[57] ABSTRACT

A sensing system for a vibration isolation table. A sensor responsive to the position of the tabletop is spaced apart from the tabletop and provides an output corresponding to the position of the tabletop. The output is modified to provide a control signal and a valve responsive to the modified signal controls the flow of air into and out of an air isolator which supports the load.

14 Claims, 7 Drawing Sheets

SCHEMATIC OF NON-CONTACTING PNEUMATIC SERVO

ANALOG STAGE FOR VIBRATION ISOLATION SERVO
—TO BE USED WITH ELECTRONIC LEVEL
TRANSDUCER 300-1-

NON-CONTACTING ELECTRO-PNEUMATIC SERVO FOR VIBRATION ISOLATION

The United States Government is entitled to practice the invention claimed herein on a royalty-free non-exclusive basis.

This is a divisional of co-pending application Ser. No. 869,981 filed on June 3, 1986 now 4,730,541.

BACKGROUND AND BRIEF SUMMARY OF THE INVENTION

Vibration isolation tables are used to support sensitive instrumentation. In a vibration isolation table a table top is supported by a vibration isolation system. The system comprises air operated vibration isolators, sensors, pneumatic controls and structural supports. These air operated vibration isolators are "air springs" in a general sense in that they utilize the compressibility of air contained in a chamber, a flexible sealing element and a load bearing piston to produce the characteristics of a low frequency spring i.e. a soft suspension for the object supported. Unlike metal springs and shock cords they can be made to accommodate a varying load without major deflection by varying the air pressure (and thus the lift force) in the air chamber.

The isolators work only by supporting an inertial mass. The vibrational forces transmitted through an isolator to the load mass decrease with increased vibrational frequency above the resonance frequency of the air spring support. That is, the transmissibility of the air-spring-and-mass system decreases with the increasing frequency of input above resonance.

To monitor and control the position of the supported mass sensing systems are integrated with the supported load and the isolators. Air control valves typically form part of the sensing systems and are designed to possess the required degree of sensitivity for effective operation. The sensing systems can provide positioning within ten thousands of an inch.

After the inertial mass or supported table top has come to equilibrium in a vibration isolation system, the positioning of the table top is controlled by the sensing system. More particularly in prior art systems a mechanical linkage is provided between an arm which contacts the supported load and a valve which controls the flow of air into and out of the isolator. The arm is biased upwardly by the pressure in the isolator. When a load is placed on the table top the arm deflects downwardly. The linkage tracks the movement of the arm and directly controls the flow of air through the valve in response to the movement of the linkage. When the valve opens, air is introduced into the isolator. The piston supporting the load rises, the arm tracking the movement of the table moves and the linkage follows the arm and ultimately causes the valve to close. Briefly, there is mechanical correspondence between the arm, the linkage and the opening and closing of the valve. In order to provide a stable configuration at the equilibrium point, the control system has a range in the vicinity of the equilibrium point in which air neither enters nor exits the isolator. The range of this dead band determines the ultimate precision with which the isolated mass or supported table can be located.

Generally a sensitivity of about ten thousands of an inch is the best that can be expected. This ten thousands of an inch range is commonly referred to as the dead band, the range the load will move through before a response can be expected. More typically the dead band in prior art systems is 40 to 60 thousands of an inch. To summarize, prior art systems employ a three state control system. These three states correspond to air entering the isolator, air exiting the isolator or a third state in which the isolator is effectively sealed off. The finite extent of this third state leads to the existence of the dead band.

The present invention is directed to a sensing system for monitoring and controlling the position of a pneumatically supported load. The sensor of the sensing system need not engage the supported load. That is, there need be no mechanical correspondence between the supported load and the sensor. A signal from the sensor is conditioned and activates a valve which controls the flow of air into and out of an isolator. The dead band inherent in the state of the art systems is essentially eliminated. In a preferred embodiment, a sensitivity of one micron (4/100 thousands of an inch) is achieved. The sensor is spaced apart from a reference plane or the like and movement between the reference plane and the sensor results in an output signal from the sensor corresponding to the relative movement. In the preferred embodiment the sensor is spaced apart from the pneumatically supported load. In an alternative embodiment the sensor is secured to the pneumatically supported load and spaced apart from a reference line.

Broadly, the invention comprises a sensor responsive to the position of a pneumatically positioned load, the sensor spaced apart from the load and providing an output corresponding to the position or orientation of the load. The output is modified to provide a control signal. A valve is responsive to the modified signal to control the flow of the air into and out of an air isolator which supports the load. The control of the flow of air is such that there is no dead band.

In an alternative embodiment of the invention, the sensor is secured to the supported load and spaced apart from a fixed reference point, plane or line.

BRIEF DESCRIPTIONS OF THE DRAWINGS

DESCRIPTION OF THE PREFERRED EMBODIMENT

The invention will be described with reference to the sensing system of the invention incorporated into a vibration isolation system and specifically micro-g ® Dual-Post Isolators, Type 4, available from Technical Manufacturing Corporation, with a table top 24 inches deep and weighing 6000 lbs. The monitoring and control of the position of the table top will be along the z axis with reference to the XY plane. However, as will be described in the alternative embodiments, the sensors of the sensings system may monitor and control the position of a pneumatically supported load in any of six degrees of freedom of the load; i.e. three in positions X, Y, and Z and three in rotation XY, XZ, and YZ.

Figure 1:
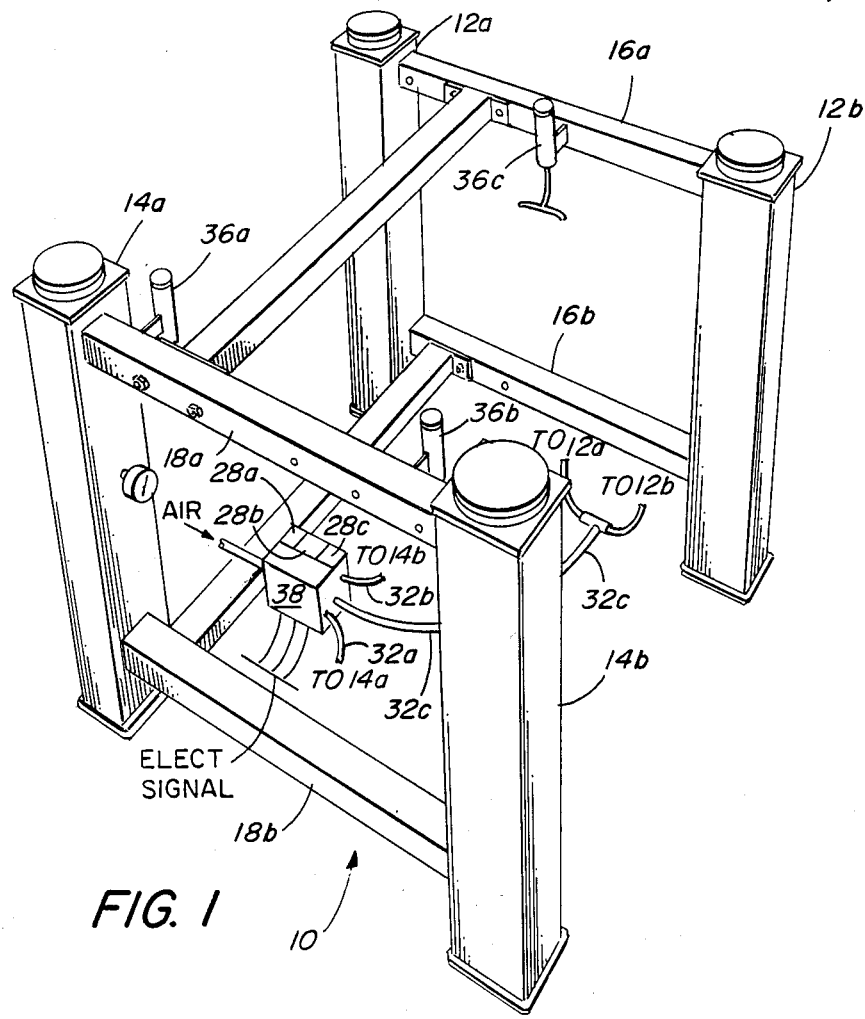
FIG. 1 is a perspective view of a vibration isolation system with a sensing system of the invention.
Figure 2:
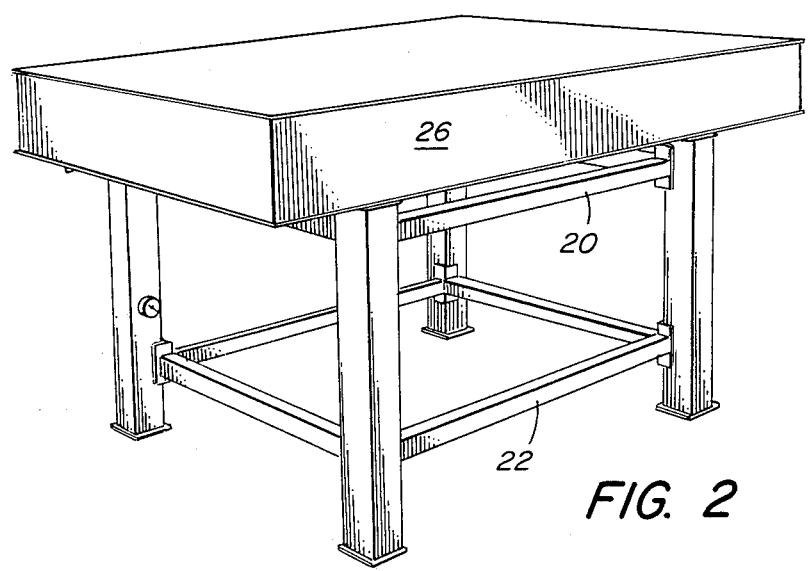
FIG. 2 is a perspective view of FIG. 1 with a table top.

Referring to FIGS. 1 and 2, a vibration isolation system is shown generally at 10 and comprises two sets of dual post isolators 12a and 12b, and 14a and 14b each with a domed piston. The dual post isolators 12a and 12b are joined to one another by struts 16a and 16b, and the dual post isolators 14a and 14b are joined by struts 18a and 18b. The sets are joined to one another by tie bars 20 and 22. Sensors are shown generally at 36a, 36b, and 36c. The three sensors 36a, 36b, and 36c are identical and only one sensor 36a will be described in detail.

Referring to FIG. 2, a table top 26 is disposed on and supported by the domed tops of the isolators 12 and 14.

Figure 3:
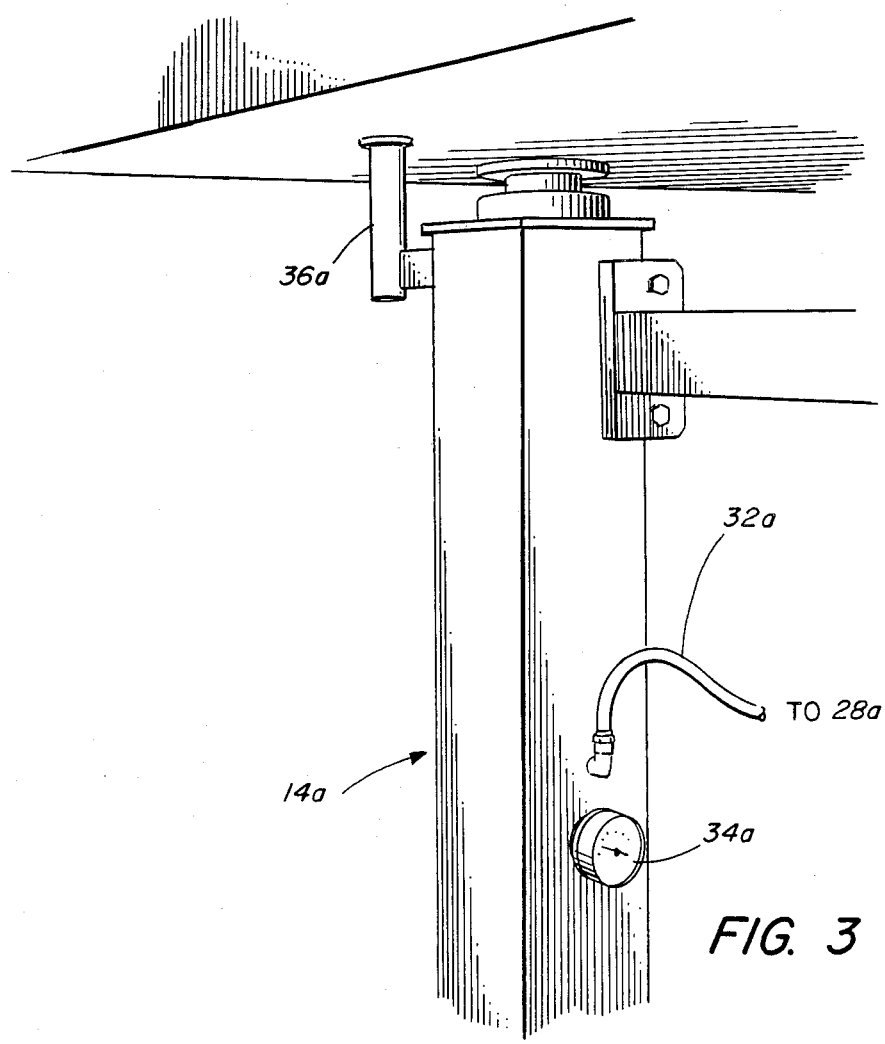
FIG. 3 is a fragmentary perspective view of an isolator sensor system-table top combination of FIGS. 1 and 2.

Referring to FIG. 3, the isolator 14a has a conduit 32a through which air can either enter or exit the isolator. The flow of air through the conduit is controlled by a 3-way two position valve 28a of the control system shown schematically in FIGS. 4 and 5. The sensors define three points in the X-Y plane and monitor the movement of the table top along the Z axis. As with prior art systems one sensor controls a valve which valve communicates with a pair of isolators and each of the other sensors provides an output to associated valves and to each of the other isolators. Here sensor 36a controls the valve 28a which communicates with isolator 14a. Sensor 36b controls valve 28b which communicates with isolator 14b and sensor 36c controls valve 28c which communicates with isolators 12a and 12b. (In prior art systems the control of the air through the conduits 32a, 23b and 32c is controlled by the mechanical valves). The fluidics of introducing the air into the isolators and the venting of the air from the isolators is known in the art and need not be described in detail.

Figure 4:
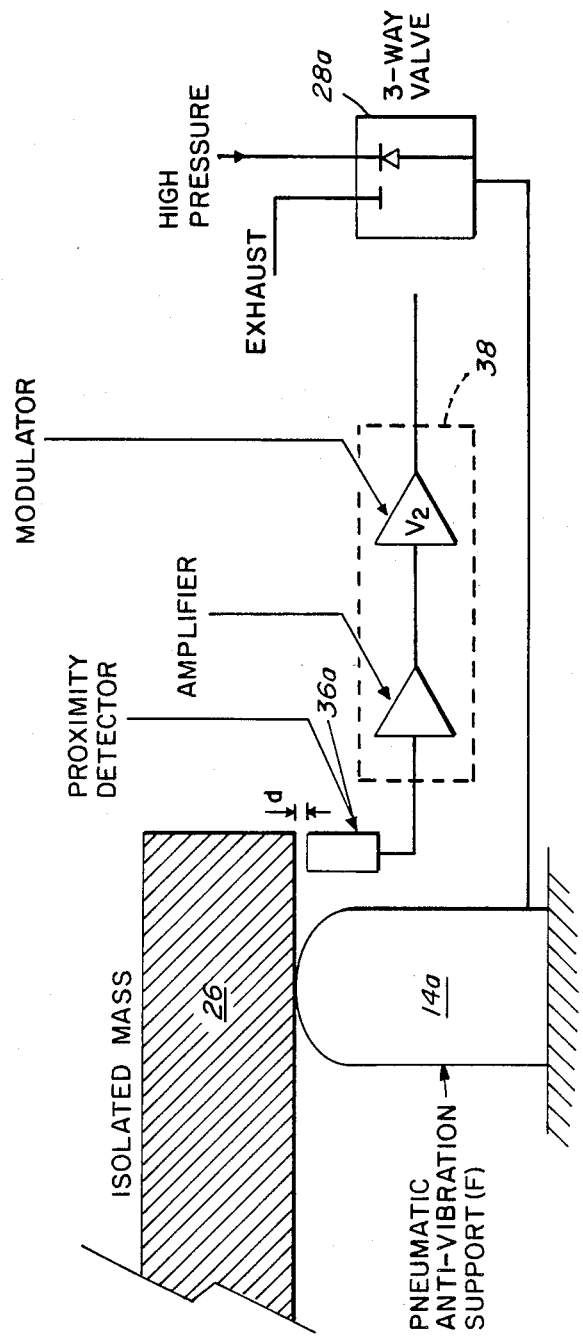
FIG. 4 is a functional block diagram of the sensing system of the invention.

Referring to FIG. 4 the sensor 36a (proximity detector) is spaced apart from the table top 26 (supported load) and provides a signal responsive to the movement to the table top 26. The signal is conditioned in the circuit control 38. The signal from the circuit activates a two state three-way valve 28a whereby air is either (1) introduced into or (2) exhausted from the isolator 14a. When the isolated mass is near the equilibrium position, the control circuit causes the valve to alternate between the two states at a frequency which is much greater than the resonant frequency of the isolated mass. In the preferred embodiment this alternation frequency was 100 Hertz while the resonant frequency of the table was approximately 1 Hertz. Because of the response characteristics of the isolator already discussed, the isolated mass will not respond to the rapid (1/100 second) input and output of gas arising from this alteration. Rather the isolated mass will respond only to the net inflow or outflow of the gas from the isolator averaged over many alternation cycles. The control of this net gas flow is determined by varying the ratio of the period in which gas enters to that in which gas exhausts the system. At the equilibrium position the net flow of gas into and out of the isolator is balanced and there is no displacement of the isolated mass. If the mass is perturbed from its equilibrium position this balance is altered and gas enters (or exits) the system until precise balance is obtained. Such a balance is obtained only when the isolated mass is at a precise distance from the proximity detector.

It is an important feature of the invention that the control system is in operation at the equilibrium position and thus has a "live zero". The ultimate limitation to the sensitivity with which a mass may be positioned is therefore the "noise" and finite gain in the control system. There is no dead band.

It is another important feature of the invention that the control system may be configured as a true integrator. This is the case in the preferred embodiment. That is the position of the isolated mass depends on the total amount of gas which has entered the isolator. The response of such an integrating servo is known in the art and one feature of such an integrating servo is that it possesses very high gain at low frequency. That is, the precision with which the mass is positioned improves with time.

A further important feature of the preferred embodiment is the use of a modulation frequency which is much higher than the resonant frequency of the free mass/pneumatic system. This insures that the isolated mass responds only to the net gas flow averaged over many alternation cycles, and does not respond to the input and output which occurs in the course of each cycle. In the preferred embodiment the overall gain of the system is selected to insure no oscillation is possible. The behavior of the integrating servo systems is known in the art and will not be described in detail. In the preferred embodiment it is sufficient to insure that the overall gain of the system does not exceed unity at the resonant frequency of the airpad (approx. 1 Hz). The maximum permissible gain in the preferred embodiment is now estimated. Let A = effective area of the isolator piston (cm$^2$)

V = effective volume of the isolator (cm$^3$)

$V_{max}$ = maximum net volumetric flow rate (cm$^{3s-1}$) through the control valve. This will be the flow rate when the valve is fully open. Assume that input and output flow rates are equal K = proximity detector characteristics (Volt cm$^{-1}$)

$G_{elec}$ = electronic gain in control amplifier

R = proportional response of pulse width modulator (Volt $^{-1}$)

Referring to FIG. 4 assume a small signal $\delta$ is inserted at the input to the amplifier ($V_1$). The output of the amplifier will change by $G_{elec}\delta$. The change in pulse width modulation will be $G_{elec}R\delta$. The net flow rate to the airpad will be $G_{elec}RV_{max}\delta$. In time T, the net volume increase in the airpad will be $G_{elec}RV_{max}T\delta$. The isolated mass will then increase by $G_{elec}RV_{max}A^{-1}T\delta$. The height change will cause a signal change from the sensor of $G_{elec}RV_{max}A^{-1}KT\delta$. Thus the overall gain at frequency $T^{-1}$ is $G = G_{elec}RV_{max}A$-1KT.

In the preferred embodiment, the components had the following characteristics.

A = 200 cm$^2$

K = 10 volt/mm = 10$^2$volt/cm

R = 1/2.5 volt (0.4$^{-1}$) = 100% mod for 2.5 volt $V_{max}$ = 2 liter min$^{-Y}$ = 33cm$^3$s$^{-1}$ For unity gain at 1 Hz, T = 1 second therefor $1 = G_{elec}$(0.4 volt$^{-1}$)(33cm$^3$s$^{-1}$)(200cm$^2$)$^{-1}$(100 volt cm$^{-1}$). This implies $G_{elec}$ = 6.6. Thus it is sufficient for stable operation that the net electronic amplification in the control circuit be less than or equal to 6.6. In other embodiments this maximum gain may be different in magnitude.

Figure 5:
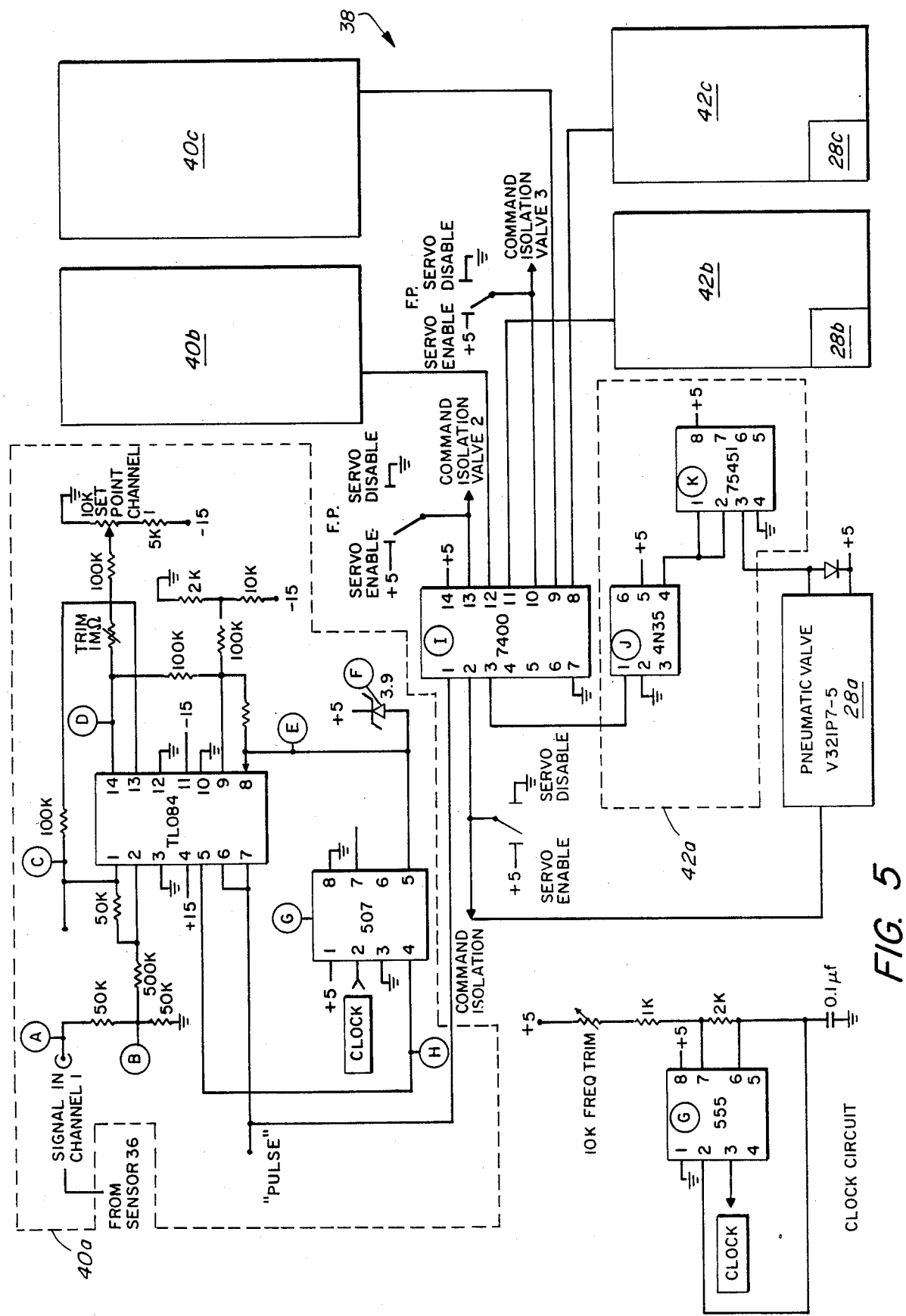
FIG. 5 is a schematic diagram of the sensing system of FIG. 4.

In the following the response of the preferred embodiment to a perturbation is described. Referring to FIG. 5, the control circuit 38 is shown generally and the control circuit 38a is shown specifically. The portions of the circuit 38 which are identical are identified as 40a, 40b 40c and 42a, 42b and 42c. The isolated mass is displaced such that it moves downwardly ten microns (0.010 millimeters). This movement would generate a change in voltage or error signal from the sensor (Metrix model 3068, probe model no. 2877-07b extension cable and model 5331-01b probe driver) of minus 80 millivolts which enters the control circuit 38 at point A. After a voltage division by two, the signal voltage is minus 40 millivolts at the first amplifier input stage, B. This amplifier stage (employing one operational amplifier in a Texas Instruments TL084ACN) is a unity gain inverting amplifier which produces an output change of plus 40 millivolts at point C. This provides the input signal to a second amplifier stage (employing one operational amplifier Texas Instruments TL084ACN) which is an adjustable gain, adjustable set point inverting amplifier. With a typical gain of five this amplifier produces a signal which differs from the set point voltage by minus 200 millivolts which appears at the output at point D. This voltage is added to a voltage of minus 2.5 volts and inverted in the third amplifier stage (employing one operational amplifier in a Texas Instrument TL084ACN) (These three stages provide for the total gain previously described). This output voltage appears at point E as plus 2.7 volts. This signal provides an input to an analog to digital converter-(Texas Instruments TL507CP). This input is protected from over and under voltage by a 3.9 volt zener diode, F. The output of the analog to digital converter is a 0–5.5 volt pulse train whose frequency is determined by the timer and whose ratio of on-state time to off-state time is determined by the input voltage. In the preferred embodiment the proportion of time which the output is high will initially increase by approximately 8%. The output pulse train which appears at point H is buffered by a follower (employing one operational amplifier in a Texas Instrument TL084ACN).

The pulse train signal may be switched on or off by the NAND gate switch I (TTL7400). This switch also controls the isolation of the valves which effectively seals off the isolator. This is required from the point of view of convenience as well as being necessary to prevent excessive gain or loss of gas from the isolator when the servo is disabled. The pulse train serves as the input to an optoelectronic insulator J,J (4N35) whose output feeds a driver K (Texas Instruments SN75451BP). The driver output causes the two state, three-way valve 28a (Norgren NC-V321P7-5BNN) to let gas enter the isolator at an initial average rate of approximately 2.6 $cm^3 s^{-1}$. This will cause the isolated mass to displace upwardly. As the mass moves upwardly the error signal will be reduced which ultimately produces a decrease in the average flow rate into the isolator. Thus the mass asymptotically returns to its initial position. Fixing the gain below the calculated value insures there is no overshoot. In practice the isolated mass returns to within one micron of its initial position within a few seconds.

In an actual test conducted with the just described embodiment, a 6,000 lb. surface plate was supported for periods of several days to within plus or minus 1 micron. This precise control is due to the live zero, integrating nature of the sensing system which gives very high gain at low frequency.

In the preferred embodiment, a table was positioned with reference to 3 positions (i.e. a fixed distance from 3 proximity detectors). Such a system defines the plane of the table top.

Figure 6:
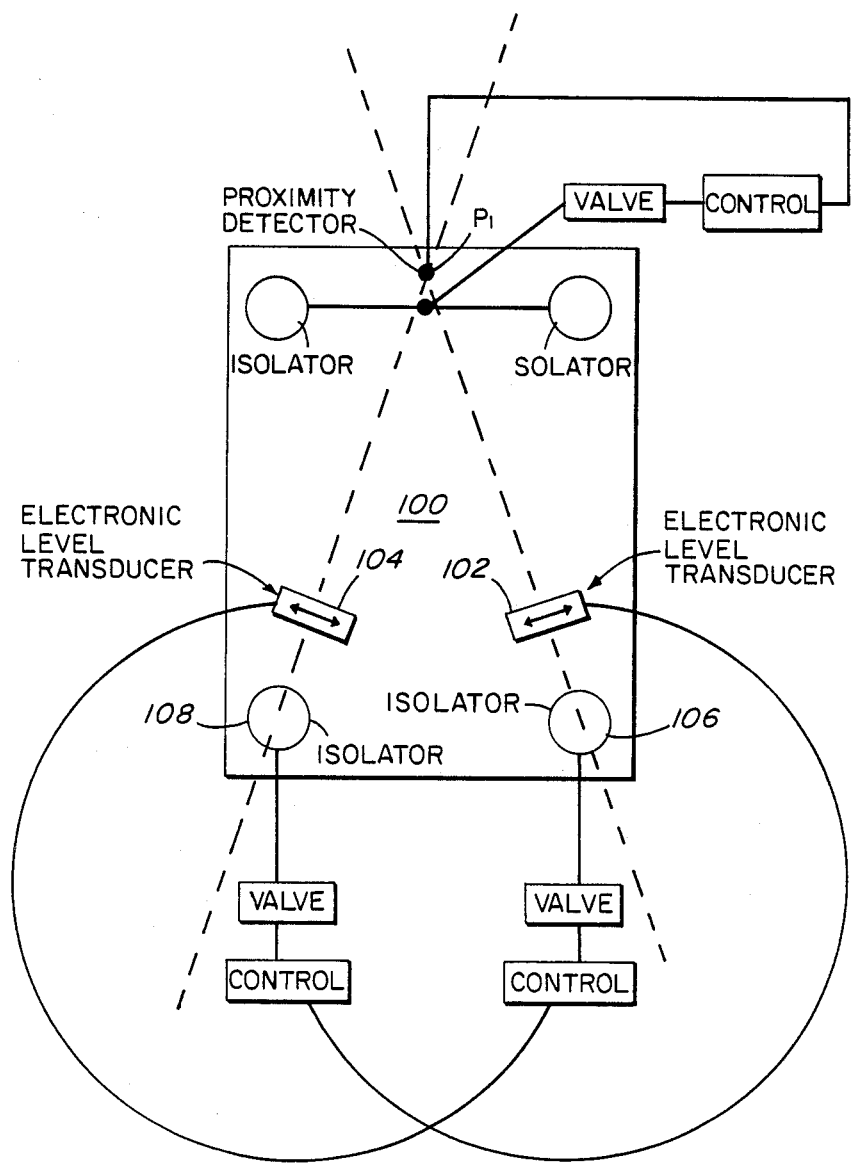
FIG. 6 is an illustrative view of the sensing system monitoring and controlling the position of a pneumatically supported load for pitch and roll.
Figure 7:
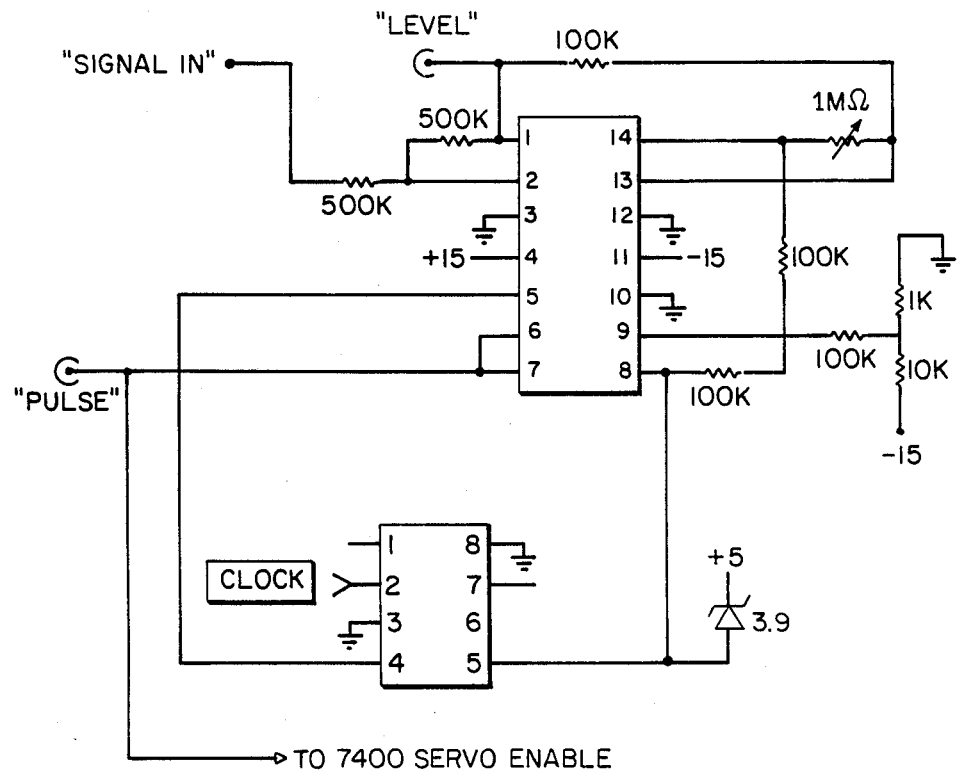
FIG. 7 is a schematic view of a modification of the circuit of FIG. 5.

Referring to FIG. 6, in an alternative embodiment the position of a table top 100 at point P1 (proximity detector) is fixed by a servo as in the preferred embodiment. Two other degrees of freedom are then fixed by sensing the roll and pitch of the table 100 with incline meters 102 and 104, such as electronic level transducers (Precision Level Vial model ELT-300-1) to provide error signals when the table is out of level with respect to local gravitational vertical. The electronic level transducers 102 and 104 are oriented perpendicular to a line which connects respective isolators 106 and 108 and the point P1 which is fixed by the proximity detector, the movement of one isolator will have a minimal effect on the electronic level transducer which controls the other isolator. A modification to the control circuit of the preferred embodiment which can be used with the ELT-300-1 is shown in FIG. 7.

The orientation of the inclinimeters is not limited to that shown in FIG. 6. Other orientations such as pure pitch and pure roll can also be employed. In such an embodiment the control electronics would include summing and differencing amplifiers to provide the appropriate error signal for each isolator.

Figure 8:
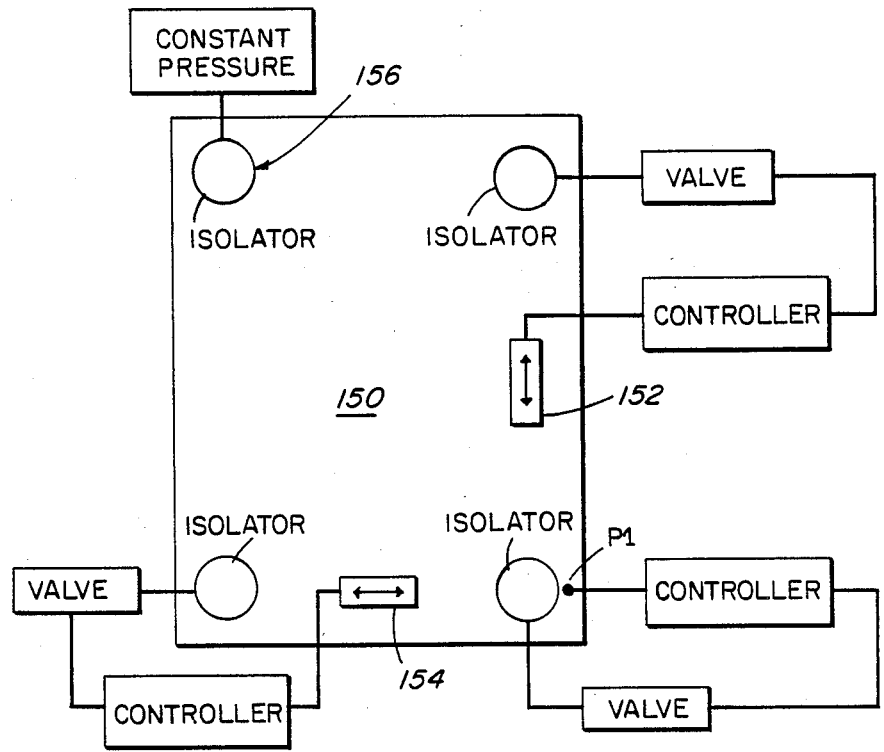
FIG. 8 is an illustrative view of the sensing system monitoring and controlling the position of a pneumatically supported load for pitch and roll.

Referring to FIG. 8, another embodiment of the invention is shown. In this embodiment the position of the isolated mass 150 is fixed at point P1 using the servo of the preferred embodiment. The pitch and roll are controlled by the electronic level transducers 152 and 154 as in the embodiment describing FIGS. 6 and 7. In this embodiment the electronic level transducers are oriented orthogonally and thus provide direct control of pitch and roll. In order to insure stability, a fourth isolator 156 is employed as a passive support. In such a passive support, either a constant pressure or constant volume of gas is introduced into the passive isolator.

Figure 9:
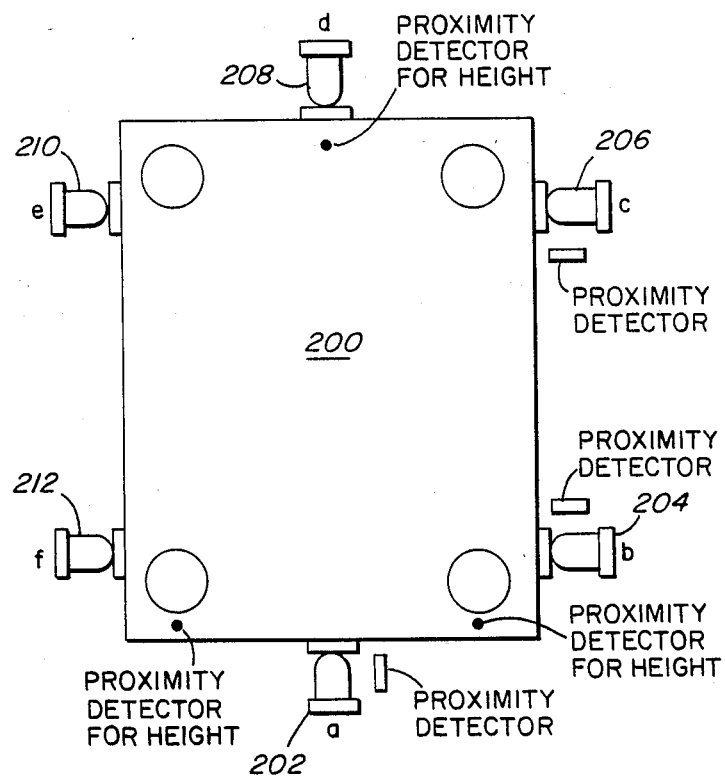
FIG. 9 is an illustrative view of the sensing system monitoring and controlling the position of a pneumatically supported load in six degrees of freedom.

Referring to FIG. 9, another embodiment of the invention is shown where the isolated mass 200 is fixed with respect to all six possible degrees of freedom. The height and level of the able are maintained as in the preferred embodiment. The orientation of the table within the plane defined by the three vertical sensors is maintained by three additional servos whose sensors are shown next to three air isolators 202, 204, and 206. Because the restoring force of gravity is absent in the horizontal plane, three additional air isolators 208, 210 and 212 are required to provide a counter-force for the pistons controlled by the servo. This embodiment provides very precise location for all possible motions of a isolated mass.

The invention has been described with a table top employing four isolators as supports. Also within the scope of the invention are isolation systems employing more or less than four isolators.

The invention has been described in reference to an inductive proximity sensor. Other types of sensors which may be used and are within the scope of this invention include but are not limited to capacitative distance sensors, interferometers, split diodes and diode arrays, infrared proximity detectors, fiber optics proximity detectors, ultrasonic proximity detectors and optical proximity detectors. Also included within the scope of this invention are sensors which provide a direct contact (though not a mechanical linkage directly to a valve). Such sensors include but are not limited to linear potentiometers, linear variable differential transformers, linear encoders, and linear Inductosyns ®. In embodiments where a rotation is to be controlled sensors which can be employed include, but are not limited to inclinimeters, levels, angle sensors, rotary encoders, rotary Inductosyns ®, variable differential transformers, rotary potentiometers, interferometers and autocollimators The circuit of FIGS. 4 and 5 is a proportioning feedback system. Other systems which will function in a similar manner to achieve the same result include proportional-integral-differential controllers (PID controllers) which are known in the art. Further, the control circuit 38 may be modified to allow twice the air flow through conduit 32c which conduit serves both isolators 12a and 12b.

The preferred embodiment of the invention an the alternative embodiments have been described in reference to the sensor being spaced apart from the supported load. It is within the scope of this invention that the sensor(s) can be secured to the supported load and spaced apart from a fixed reference point and the distance the supported load moves with reference to the fixed reference point is sensed to provide the output signal. For example the reference might be the distance to a fixed point, a line defined by a stretched wire, a reference laser beam, the local gravitational vertical etc. Preferably the load or series of loads can be orientated with respect to a reference laser beam. Also it is within the scope of this invention that where more than one sensor is used they can all be spaced apart from the supported load or alternatively they may all be secured to the supported load and spaced apart from a fixed reference point or any combination of sensors spaced apart from the supported load and/or secured to the supported load may be used.

Having described my invention, what I now claim is:

1. An apparatus for monitoring and controlling the position of a pneumatically supported load at least one air isolator controlling the movement of the mass in the XY plane which comprises:
   a sensor adapted to provide a sensor signal corresponding to the displacement of the supported load in the x-y plane, the sensor signal varying depending upon the displacement of the supported load;
   means to process the sensor signal and to provide a modulated, two-state, pulsed output signal at a modulation frequency, the duty cycle of the output signal determined by the sensor signal;
   a two-state pneumatic valve actuated by the output signal such that there is a net flow of air into or out of the air isolator when the load is not at its zero position, whereby as the load moves to its zero position the net flow of air into or out of the air isolator decreases; and
   means to control the modulation frequency such that it is higher than the resonant frequency of the free mass/pneumatic system to ensure that the isolated mass responds only to the net gas flow averaged over may alternation cycles and does not respond to the input and output which occurs in the course of each cycle.

2. The apparatus of claim 1 which includes three vertical sensors and three horizontal sensors to measure the position of the mass within its six possible degrees of freedom.

3. The apparatus of claim 1 wherein the sensor is secured to the supported load and is spaced apart from a reference point.

4. The apparatus of claim 1 which comprises:
   means to control the input and output of gas into the isolator such that the supported load when displaced will return to its zero position asymptotically.

5. The apparatus of claim 1 wherein the sensor is positioned to measure the displacement of the supported mass along the X axis and which comprises a second sensor positioned to measure the displacement of the mass along the Y axis and a second air isolator in combination with the second sensor to control the movement of the mass along the Y axis.

6. The apparatus of claim 5 which comprises a third sensor positioned to measure the displacement of the mass along the Z axis in combination with a third air isolator.

7. The apparatus of claim 1 which comprises:
   means to vary the ratio of the air entering into and exhausting the isolator.

8. The apparatus of claim 7 which comprises:
   means to control the frequency of the output signal.

9. The apparatus of claim 1 wherein the sensor is secured to the supported load and is spaced apart from a reference point.

10. A method for monitoring and controlling the position of a pneumatically supported load at least one air isolator controlling the movement of the mass in the XY plane and wherein a sensor is in communication with a valve which controls the flow of gas into and out of the air isolator which includes:
    sensing the displacement of the supported load in the XY plane;
    providing a signal from the sensor corresponding to the position of the supported load;
    processing the signal to provide a modulated, two-state pulsed output signal at a modulation frequency its duty cycle determined by the sensor signal;
    controlling the net flow of the air into or out of the air isolator by the output signal actuating a two-state pneumatic valve, the net flow of air into or out of the isolator occurring when the load is not at its zero position the net flow of air decreasing as the load moves to its zero position; and
    controlling the modulation frequency such that it is higher than the resonant frequency of the free mass/pneumatic system to ensure that the isolated mass responds only to the net gas flow averaged over many alternation cycles and does not respond to the input and output which occurs in the course of each cycle.

11. The method of claim 10 which includes:
    controlling the input and output of the gas into the isolator such that the supported load when displaced will return to its zero position asymptotically.

12. The method of claim 10 which includes:
    varying the ratio of the gas generating into and exhausting the air isolator.

13. The method of claim 10 which includes: averaging the net flow over a plurality of alternation cycles.

14. The method of claim 10 which includes sensing the displacement of the supported mass in any one of its possible six degrees of freedom.

* * * * *